United States Patent
Chambers, Jr. et al.

(10) Patent No.: US 9,317,274 B2
(45) Date of Patent: Apr. 19, 2016

(54) APPARATUS, SYSTEM AND METHOD FOR INTEGRATED CUSTOMIZATION OF MULTIPLE DISK IMAGES INDEPENDENT OF OPERATING SYSTEM TYPE, VERSION OR STATE

(75) Inventors: Howell Jack Chambers, Jr., Wake Forest, NC (US); Franklin Wayne Harris, Raleigh, NC (US); David Edward Karner, Raleigh, NC (US); James Andrew North, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 1494 days.

(21) Appl. No.: 12/187,086

(22) Filed: Aug. 6, 2008

(65) Prior Publication Data

US 2010/0037207 A1 Feb. 11, 2010

(51) Int. Cl.
*G06F 9/44* (2006.01)
*G06F 9/445* (2006.01)

(52) U.S. Cl.
CPC .......................................... *G06F 8/63* (2013.01)

(58) Field of Classification Search
None
See application file for complete search history.

(56) References Cited

U.S. PATENT DOCUMENTS

| | | | | |
|---|---|---|---|---|
| 6,080,207 A * | 6/2000 | Kroening et al. | ............. | 717/172 |
| 6,247,140 B1 * | 6/2001 | Chase-Salerno et al. | ......... | 714/2 |
| 6,629,136 B1 * | 9/2003 | Naidoo | ........................ | 709/219 |
| 6,760,862 B1 * | 7/2004 | Schreiber et al. | .............. | 714/15 |
| 7,080,371 B1 * | 7/2006 | Arnaiz et al. | .................. | 717/170 |
| 7,356,679 B1 * | 4/2008 | Le et al. | ............................ | 713/1 |
| 7,941,704 B2 * | 5/2011 | Itoh | .............................. | 714/38.1 |
| 8,307,008 B2 * | 11/2012 | Pinkerton et al. | ............. | 707/793 |
| 8,321,859 B2 * | 11/2012 | Shapiro | ......................... | 717/175 |
| 2003/0115186 A1 * | 6/2003 | Wilkinson et al. | ................ | 707/3 |
| 2003/0222908 A1 * | 12/2003 | Bybee et al. | ................. | 345/749 |
| 2004/0078692 A1 * | 4/2004 | Jackson et al. | .................. | 714/38 |
| 2004/0181544 A1 * | 9/2004 | Anderson | ..................... | 707/102 |
| 2004/0236715 A1 * | 11/2004 | Krebs | .............................. | 707/1 |
| 2007/0061345 A1 * | 3/2007 | Thompson et al. | ........... | 707/100 |
| 2009/0094378 A1 * | 4/2009 | Reus et al. | ..................... | 709/235 |
| 2009/0138360 A1 * | 5/2009 | Choti et al. | ..................... | 705/14 |
| 2009/0276206 A1 * | 11/2009 | Fitzpatrick et al. | .............. | 704/2 |
| 2009/0300151 A1 * | 12/2009 | Friedman et al. | ............. | 709/222 |
| 2009/0300596 A1 * | 12/2009 | Tyhurst et al. | .................. | 717/173 |
| 2011/0283097 A1 * | 11/2011 | Weber et al. | ................... | 713/2 |
| 2014/0258979 A1 * | 9/2014 | Zhang et al. | .................. | 717/120 |

* cited by examiner

*Primary Examiner* — Evral Bodden
(74) *Attorney, Agent, or Firm* — Kunzler Law Group

(57) ABSTRACT

An apparatus, system, and method are disclosed for customizing a disk image. A base image is booted and the desired customizations are applied and captured using a known method. A maintenance environment is booted and a builder module incorporates the captured customizations into an integrated package. If user input is required then custom menus are also defined. A target operating system, independent of the base image, is hooked to invoke an injector module. The operating system is booted from the maintenance environment thereby invoking the injector module. The customizations from the integrated package together with any obtained from the custom menus are injected into the operating system. A customized image of the operating system is then saved, to be deployed to other computers or further customized as required.

24 Claims, 9 Drawing Sheets

APPARATUS, SYSTEM AND METHOD FOR INTEGRATED CUSTOMIZATION OF MULTIPLE DISK IMAGES INDEPENDENT OF OPERATING SYSTEM TYPE, VERSION OR STATE

BACKGROUND OF THE INVENTION

1. Field of the Invention

This invention relates to computer system configuration and more particularly relates to disk image customization.

2. Description of the Related Art

Ever since the first bootstrap loaders were entered via toggle switches on the front control panel of early computers, streamlining and automating system initialization and configuration has been an important design goal. Sophisticated maintenance environments now exist which are almost operating systems in their own right, and may be based either in firmware or the lower functional levels of an actual operating system. The operating system is now typically loaded from a disk image with little or no manual intervention.

While a disk image is very compact and may be loaded very quickly, it has the disadvantage of being a static snapshot (hence the term "image") of the operating system state as it existed at a single point in time. It therefore lacks flexibility and platform independence.

Prior-art solutions to the problem have included systems management and configuration facilities. Such facilities become very large and complex systems in their own right, providing the desired flexibility and platform independence, but sacrificing simplicity and efficiency to some extent. Customized configuration of systems is typically performed by complex scripts, or manually with the assistance of various tools, drawing upon large, distributed databases of information from which to download the specific customizations that may be required over a network as they are needed. The database and network management that is involved starts to approach the complexity of the primary systems themselves that are being managed thereby. Efficient systems management, including configuration and change control, remains one of the perennial challenges facing the computer industry.

SUMMARY OF THE INVENTION

From the foregoing discussion, it should be apparent that a need exists for an apparatus, system, and method that automates and streamlines computer disk image customization. Beneficially, such an apparatus, system, and method would exhibit the compactness and efficiency of disk imaging while providing the flexibility and platform independence of systems management for purposes of initial system configuration, data migration, and system cloning.

The present invention has been developed in response to the present state of the art, and in particular, in response to the problems and needs in the art that have not yet been fully solved by currently available computer system initialization and configuration facilities. Accordingly, the present invention has been developed to provide an apparatus, system, and method for disk image customization that overcome many or all of the above-discussed shortcomings in the art.

The apparatus to customize a disk image is provided with a plurality of modules configured to functionally execute the necessary steps of capturing, packaging, and injecting the customizations into a disk image. These modules in the described embodiments include a single integrated package of customizations, a builder module, and an injector module.

The apparatus, in one embodiment, is configured to capture the customizations as already applied to a baseline disk image via existing manual or other known methods. The builder module harvests the customizations and incorporates them into the integrated package, in a form which is image-independent. The injector module may then apply those packaged customizations to a target disk image for a computer system under configuration.

The apparatus is further configured, in one embodiment, to generate custom menus to obtain customization information which was not among the customizations applied to the baseline disk image. The custom menus are generated by the builder module and incorporated into the integrated package, where they may be subsequently accessed by the injector module and displayed to permit the user to enter the required information. Such user-specific information might include a user ID, work location, native language, time zone, department, needed applications, and so forth.

In a further embodiment, the apparatus may be configured to infer the needed information from user characteristics obtained via the custom menus. For example, the native language might be inferred from the user's geographical work location, and the needed applications might be inferred at least in part from the user's organizational department.

The platform independence of the integrated package may take several forms. For example, customizations originally applied to one operating system type, such as Linux, could be applied to a different operating system type, such as Unix. Customizations to one operating system version, such as Windows XP, could be applied to a different version, such as Windows Vista. Customizations applied to a given operating system, such as Windows, in one state, such as a non-sysprepped setup state, could be applied to the operating system in another state, such as sysprepped setup state (sysprep denotes Windows system preparation, which is performed in conjunction with a known method of customization).

A system of the present invention is also presented to customize a disk image. The system may be embodied as a data-processing platform. In particular, the system, in one embodiment, includes a computer and a storage system which hosts the above-described apparatus.

The system may further include a maintenance environment running on the computer to host the builder and injector modules. The maintenance environment may be firmware-based, such as BIOS or EFI, operating-system-based, such as DOS or Windows PE, or a combination of both.

The storage system may be of any size, media, or organization, including a local hard disk; removable storage such as a CD, DVD, or flash memory device; or a distributed storage network. Although the integrated package of customizations is a single logical entity, multiple instances having varying degrees of customization may be distributed throughout the storage system. This is in contrast to prior-art technology in which customization information is scattered throughout a network and must be located, separately accessed, and downloaded "over the wire" in response to specific requests.

A method of the present invention is also presented for customizing a disk image. The method in the disclosed embodiments substantially includes the steps necessary to carry out the functions presented above with respect to the operation of the described apparatus and system. In one embodiment, the method includes loading a baseline image, applying customizations via some known method, capturing the customization and building them into an integrated package, loading a target disk image, and injecting the integrated package by programmatically applying the customizations.

The method also may include generating custom menus to obtain customization information not applied to the baseline image.

In a further embodiment, the method includes hooking the target operating system to automatically invoke one or more programs to apply the customizations while the operating system is booting. It may also be necessary in some cases to enable autologon so as not to halt the operating system from booting in a fully unattended fashion.

In an embodiment, data migration may also be implemented by saving data from the target system before loading the target disk image, and then restoring the saved data after the integrated package has been injected. A specification of the data to be migrated may be supplied by the integrated package, but the data itself would of course come from the pre-customized system, so as to maintain integrated package portability rather than tying it to a specific system.

In another embodiment, system cloning may be accomplished by loading the customized target disk image onto one or more additional computers. The cloned computers could then be further customized, if desired, by a second invocation of the present invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
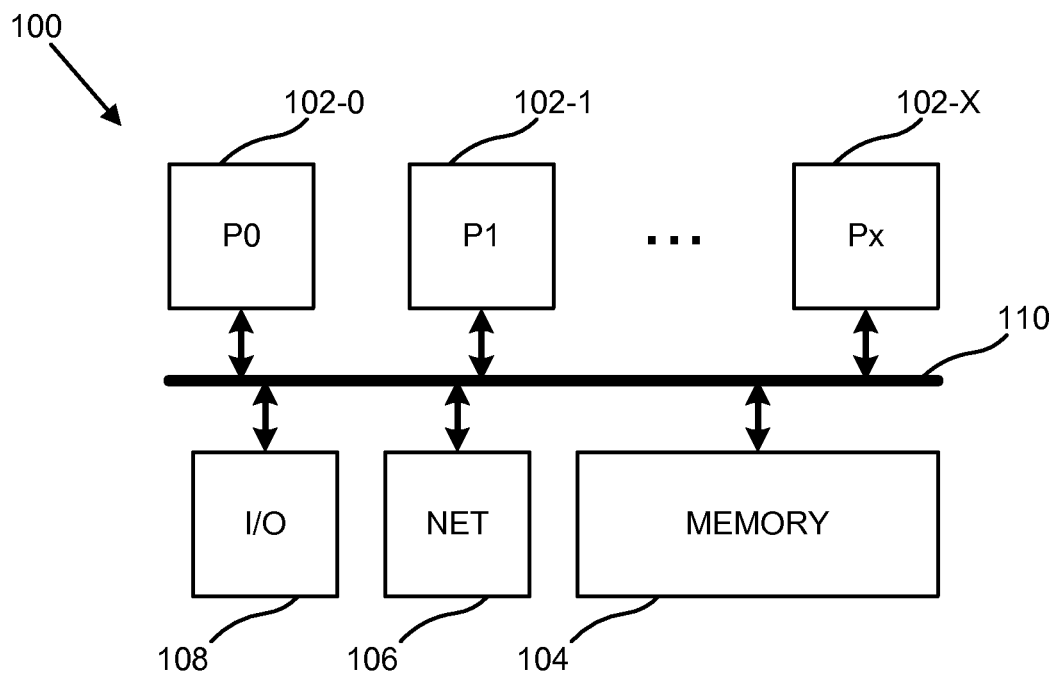
FIG. 1 is a schematic block diagram illustrating a possible computer hardware platform upon which the present invention may be at least in part deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates a possible computer hardware platform 100 upon which the present invention may be at least in part deployed. The hardware platform 100 may include processor(s) 102, memory 104, a network interface 106, and an input/output device interface 108, connected through a bus 110.

The hardware platform 100 may be of any form factor or type, including an embedded system, a handheld, a notebook, a personal computer, a minicomputer, a server, a mainframe, and a supercomputer.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, and hyperthreaded processors.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. In one embodiment, it may be integrated with the input/output device interface 108.

The input/output device interface 108 may be driven primarily by the processor(s) 102 or may incorporate an independent I/O processor subsystem. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
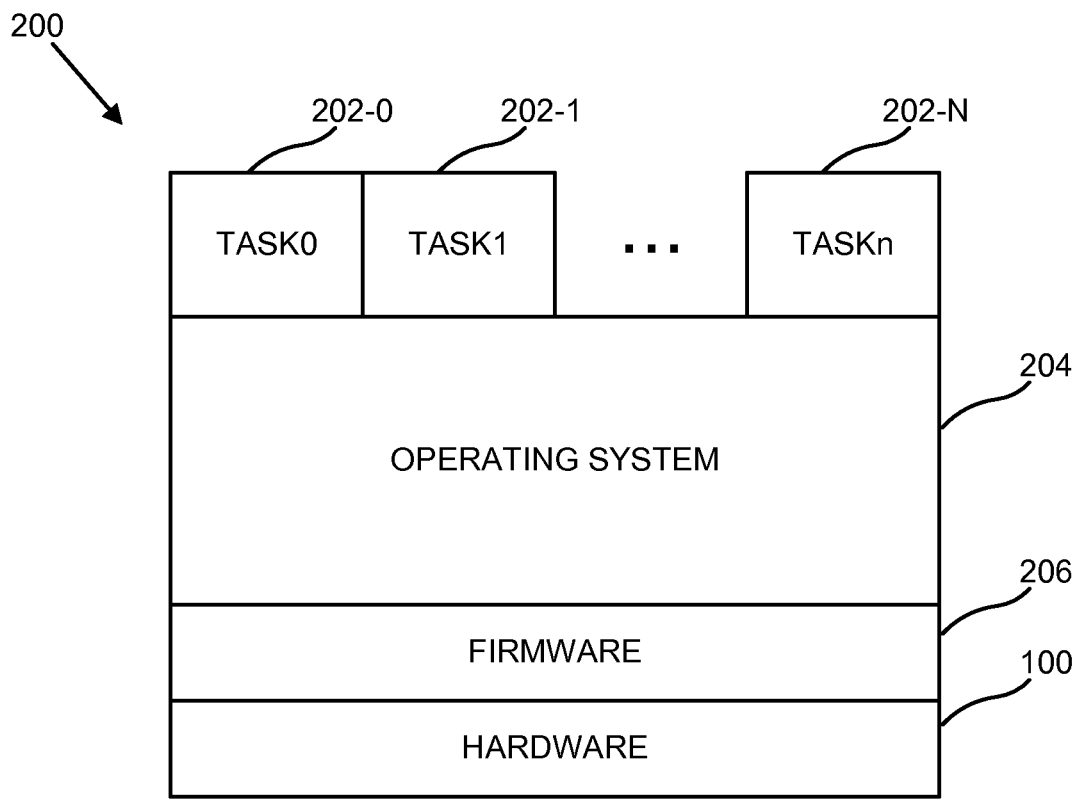
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, and middleware. System-level task(s) 202 may include services, drivers, daemons, and utilities.

The operating system 204 may be of any type and version and in any state. Types may include Unix, Linux, Windows, Mac, MVS, and VMS. Versions may include Windows XP and Windows Vista. States may include a degree of customization, a mode of operation, and a system preparation for setup. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
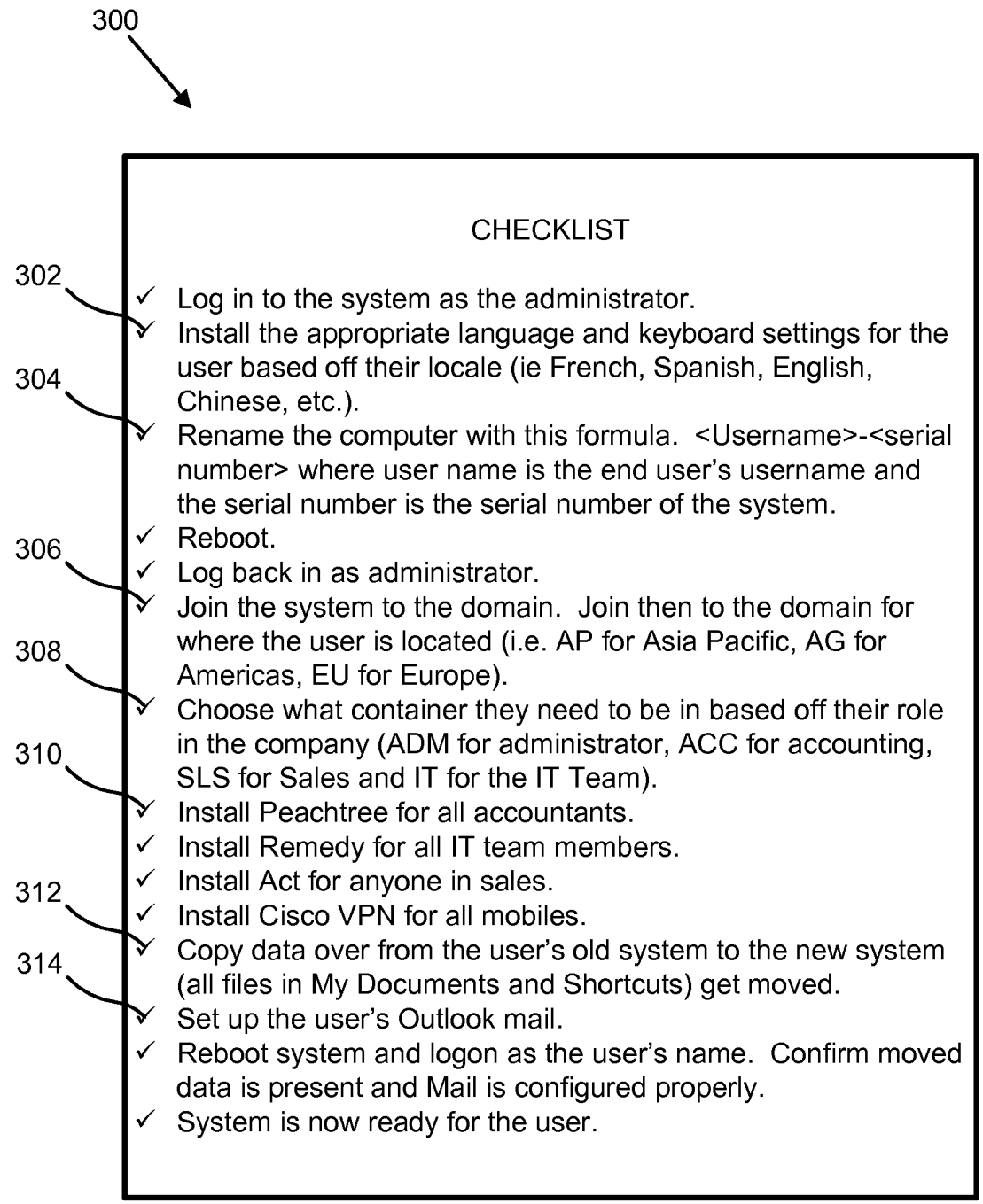
FIG. 3 is a sample of a manual checklist for customizing the configuration of a computer disk image of the computer.

FIG. 3 is a sample of a manual checklist 300 for customizing the configuration of a computer disk image of the computer 200, as might be performed by a technician or a user. The checklist 300 may include geographical items 302 such as specifying language and locale; profile items 304 such specifying as user name, system serial number, and computer name; domain items 306 to provide protected access to resources for a given region, such as Asia Pacific, the Americas, or Europe; container items 308 to provide protected access to resources for a given organizational area, such as administration, accounting, sales, or IT (information technology); application items 310 to support different classes of users, such as installing an accounting package for accountants, technical tools for IT team members, CRM (customer relation management) for sales personnel, or VPN (virtual private network) for mobile users; data migration items 312 such as copying over existing documents or shortcuts; and communication items 314 such as configuring email clients, connecting to email servers, and initializing default email settings. Other items not explicitly shown may include disk partitioning, operating system 204 installation, patching, sysprep, system recovery, and initial backup.

Figure 4:
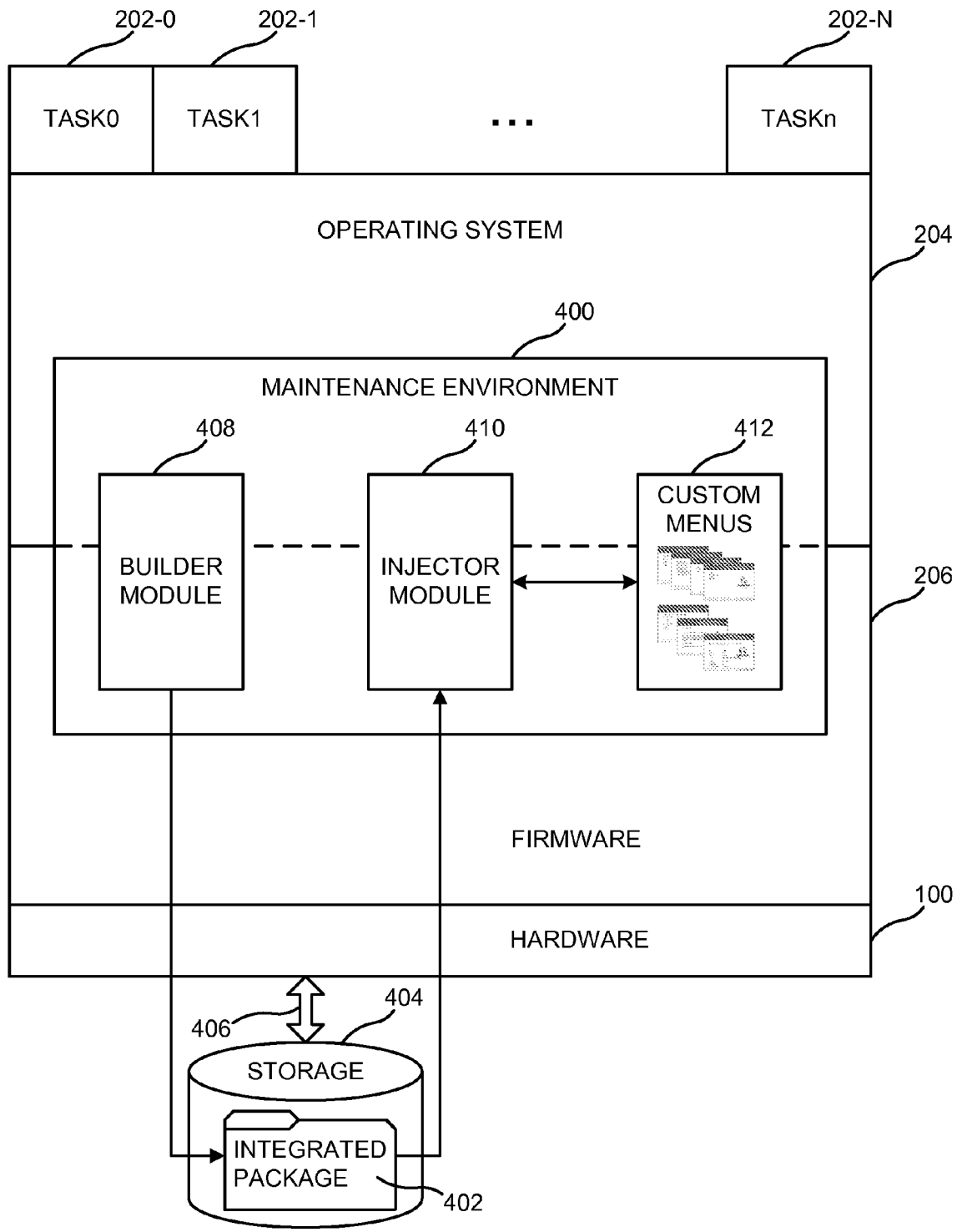
FIG. 4 is a schematic block diagram of a facility for automating the manual checklist within a maintenance environment by programmatically building and injecting an integrated package of customizations into a computer disk image.

FIG. 4 is a schematic block diagram of a facility for automating the manual checklist 300 within a maintenance environment 400 by programmatically building and injecting an integrated package 402 of customizations into a computer disk image. The integrated package 402 is held in a storage system 404 connected to the hardware platform 100 of the computer 200 via a storage interface 406. The storage system 404 may be local or distributed, fixed or removable, comprising any media, or having any form factor. The storage interface 406 may be directly connected to the hardware platform 100 via the input/output device interface 108, or may be remotely connected via the network interface 106. In either case, the integrated package 402 comprises a single, self-contained logical entity, such as a folder or directory, as opposed to disparate elements that must be individually located and downloaded across a network.

The integrated package 402 is created by a builder module 408, which captures the necessary information concerning customizations which have been applied to a base image according to a procedure as specified in checklist 300. The resulting integrated package 402 is independent of the customized base image from which it was generated. Consequently, an injector module 410 may programmatically apply the same customizations to a target image having a target operating system of a different type, version, or state. However, the injector module 410 must itself be aware of the operating-system-related differences, thus potentially having to be updated as new types, versions, or states are developed. Beneficially, the integrated package 402 has no such dependencies.

Examples of operating system types may include Linux, Unix, and Windows, among others. For purposes of illustration, the Windows environment will be assumed herein. Within that environment, examples of operating system versions may include XP and Vista, and examples of operating system states may include a sysprepped setup state and a non-sysprepped setup state. These assumptions are not meant to preclude embodiments having a different number or kind of operating system types, versions, or states.

For customizations which are specific a single user or class of users, custom menus 412 may generated by the builder module 408 to obtain that information later directly from a technician or user running the injector module 410. The number and content of the custom menus 412 therefore depend on which customizations were built into the integrated package 402 and which were left to be specified later.

A horizontal dotted line through the maintenance environment 400 indicates that it may reside either in the firmware 206, the operating system 204, or both. Examples of a firmware-based maintenance environment 400 include BIOS and EFI. Examples of an operating-system-based maintenance environment 400 include DOS and Windows PE. Note that the builder module 408, injector module 410, and custom menus 412 all straddle the dotted line, indicating that they also may run under either or both of the firmware 206 and the operating system 204. A disadvantage of running under the operating system 204 would that it may be less secure if the user has modified the target image. An advantage would be the ability to update the target operating system 204 if needed. The transition across the dotted line from the firmware-based to the operating-system-based maintenance environment 400 occurs approximately midway during the boot process when control is handed off from the firmware 206 to the operating system 204 after the image has been loaded into the memory 104. A reboot is generally required to return to the firmware-based maintenance environment 400.

Figure 5:
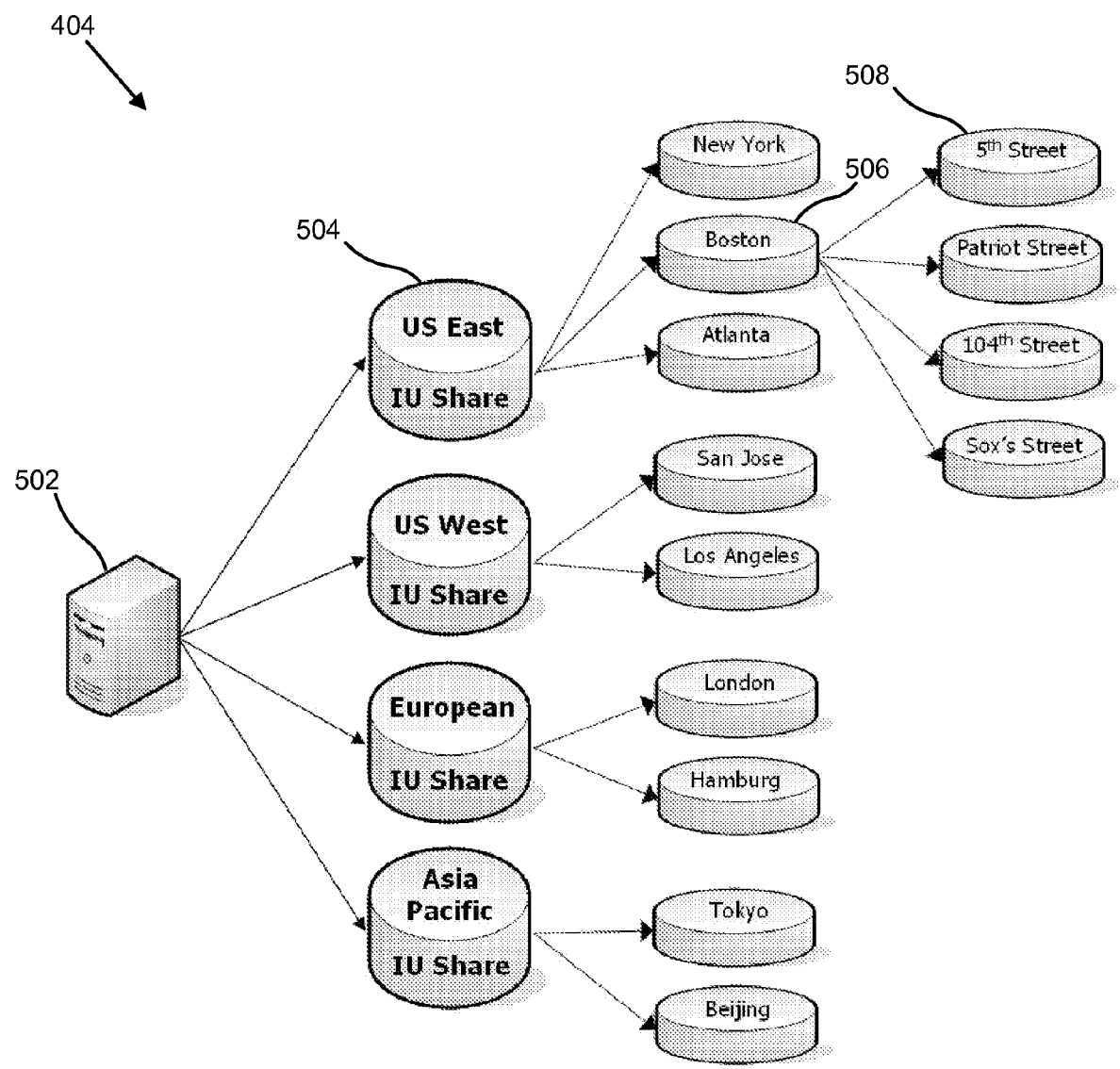
FIG. 5 is a schematic block diagram of a distributed storage system for storing and deploying the integrated package.

FIG. 5 is a schematic block diagram of a distributed storage system 404 for storing and deploying the integrated package 402. Although the integrated package 402 is a single logical entity, multiple copies and differently customized instances may exist across the distributed storage system 404. In an embodiment, there may be a central global repository 502 holding an integrated package 402 of customizations that are common to an entire organization worldwide. A further customized instance of the integrated package 402 directed to a given geographical region such as US East may be built and held in a regional repository 504 such as an IU (ImageUltra) Share. Additional customizations specific to a given area within the foregoing region, such as Boston, may be incorporated into the integrated package 402 and held in a metropolitan repository 506. Different branch offices within the foregoing metropolitan area, such as the Fifth Street location, may have their own individual customization requirements, which can be added to the integrated package 402 and held in a local repository 508. As additional customizations are built into the increasingly localized levels of integrated packages 402, the corresponding custom menus 412 may be pared down accordingly, thereby requiring less manual involvement by an end user or technicians responsible for the various levels.

Figure 6:
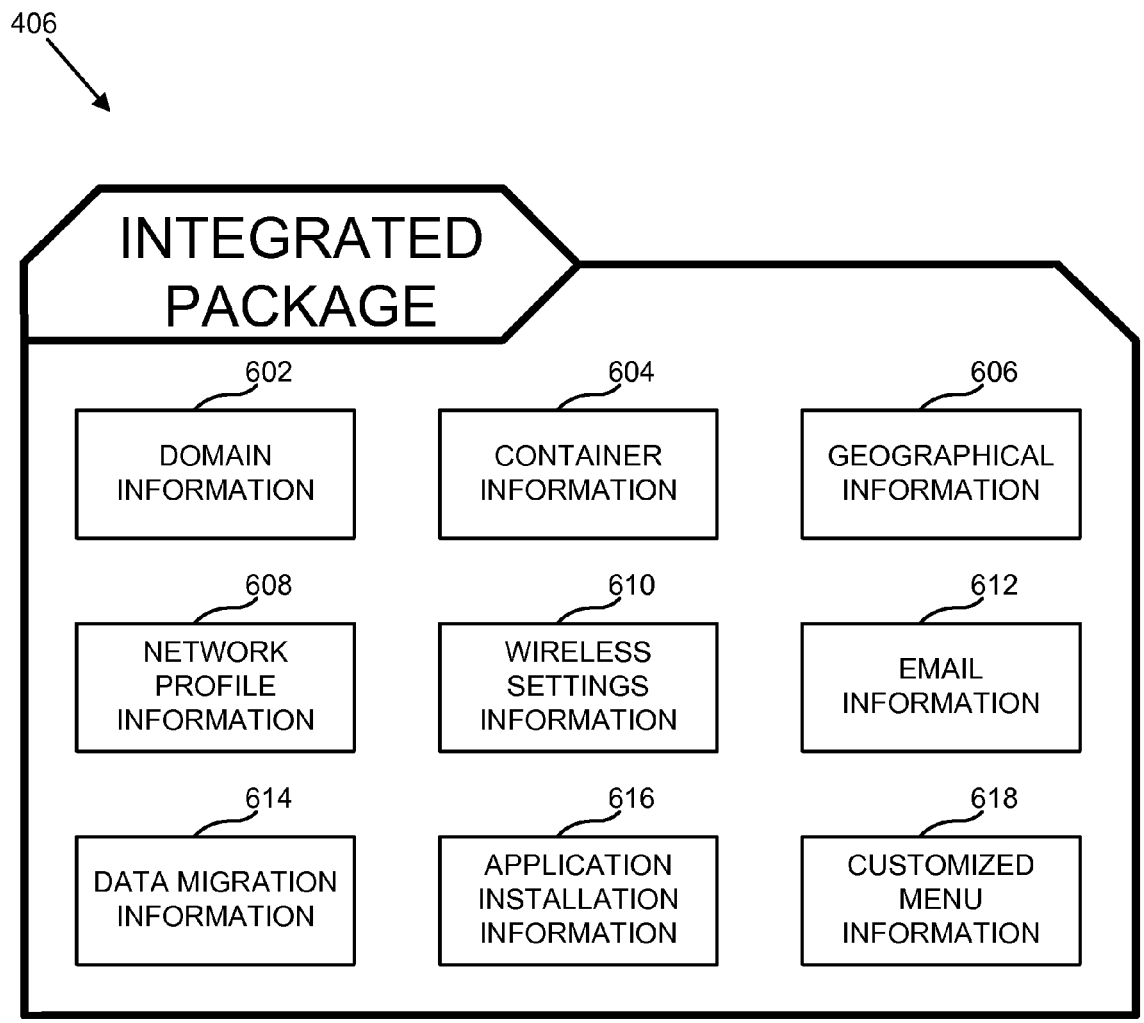
FIG. 6 is a schematic block diagram of the integrated package.

FIG. 6 is a schematic block diagram of the integrated package 402. In the embodiment shown, the integrated package 402 includes domain information 602, container information 604, geographical information 606, network profile information 608, wireless settings information 610, email information 612, data migration information 614, and custom menu information 616. Other embodiments may include more or less information according to the customization requirements of a given class of users. In most cases, information related to a single individual user would not be included, such as actual user data to be migrated as specified by data migration information 614, a computer name in connection with network profile information 608, or a driver for a wireless card having wireless setting information 610. Instead, such system- or user-specific information would be gleaned from the system itself or obtained from the user via the custom menus 412.

Figure 7:
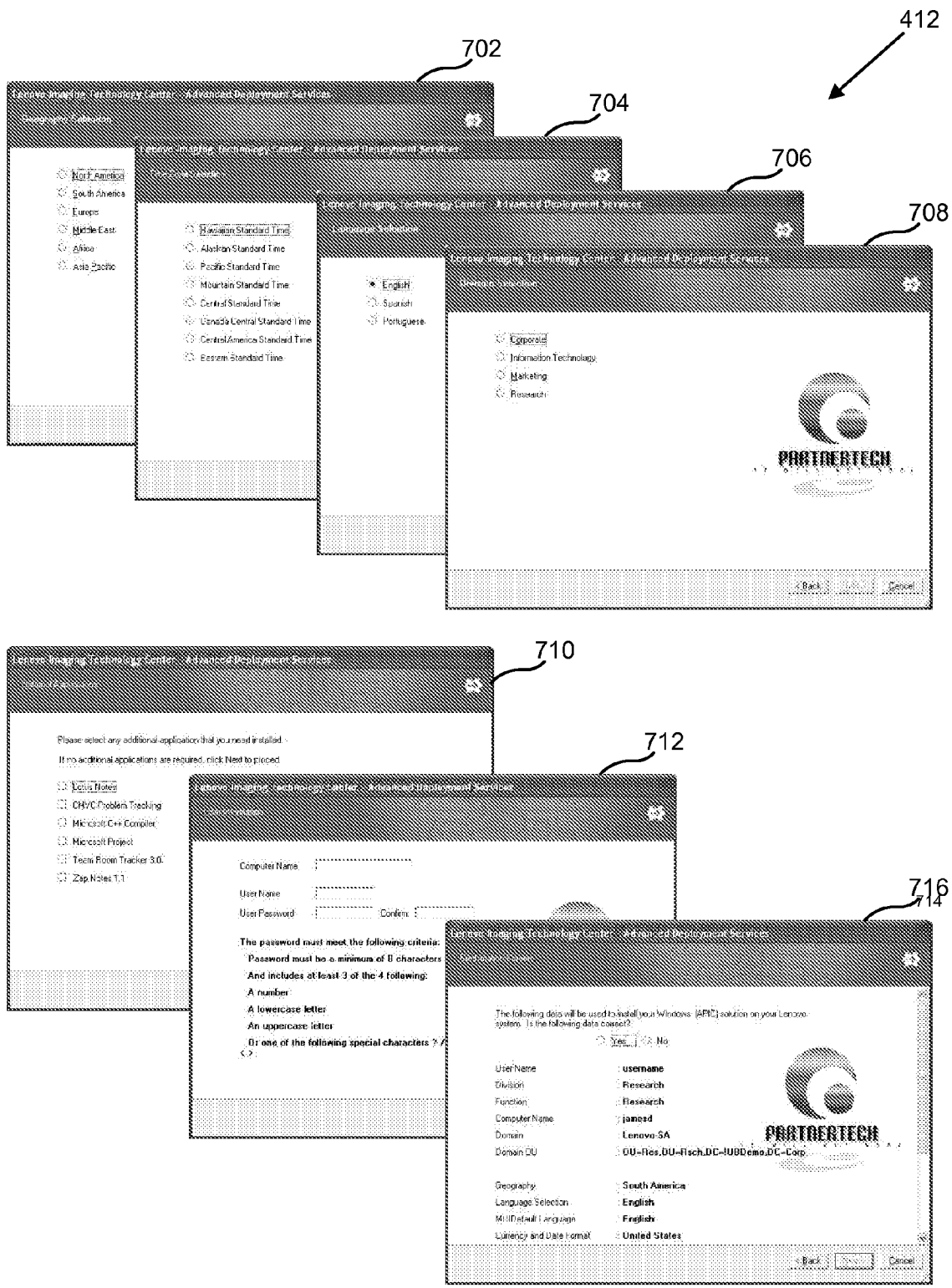
FIG. 7 depicts a set of custom menus for obtaining user input in customizing the configuration of a computer disk image.

FIG. 7 depicts a set of custom menus 412 for obtaining user input in customizing the configuration of a computer disk image. A region menu 702 allows a geographical region to specified, from which the domain information 602 may be inferred. A time zone menu 704 allows the computer clock to be properly set. A language menu 706 allows the user's native language to be specified, which could alternatively be inferred from a more precise geographic specification. A container menu 708 permits a functional area to be specified, thereby enabling access to resources dedicated specifically to that organizational function. An application menu 710 offers a selection of specific software applications, some of which could alternatively be inferred from the container menu 708. A profile menu 712 enables the end user or supporting technician to specify a computer name, user name, and password. A confirmation menu 714 displays all of the information as entered via the foregoing menus. If an error is found, it is possible to go back to an earlier menu and make a correction, and then return to the confirmation menu to verify the change. Once the specified information has been confirmed, it is then injected into the disk image.

Figure 8:
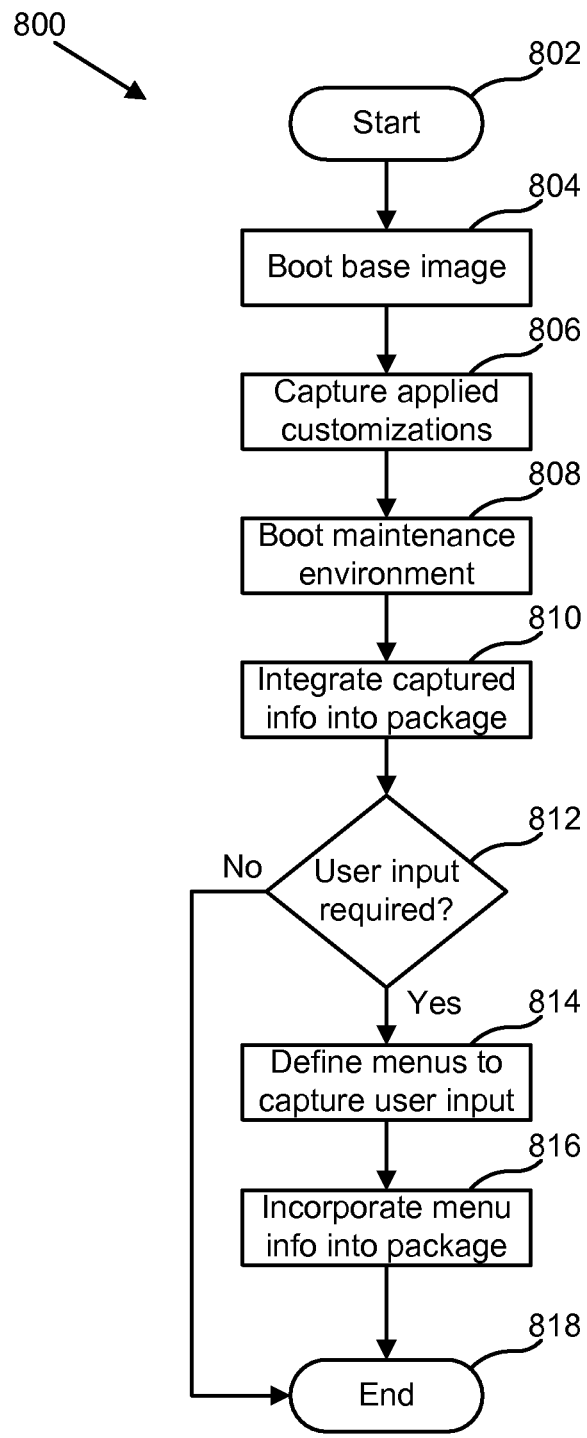
FIG. 8 is a schematic flow chart diagram illustrating one embodiment of a method for building the integrated package in accordance with the present invention.

FIG. 8 is a schematic flow chart diagram illustrating one embodiment of a method for building the integrated 402 package in accordance with the present invention. The method 800 starts 802 and a base image is booted 804. The desired customizations are applied and captured 806 using an existing technology such as ImageUltra. A maintenance environment 400 is booted 808 and the builder module 408 integrates 810 the captured customizations into the integrated package 402. If user input is not required 812 then the method 800 ends 818. If user input is required 812 then custom menus 412 are defined 814 and incorporated 816 into the integrated package 402 and the method 800 ends 818.

Figure 9:
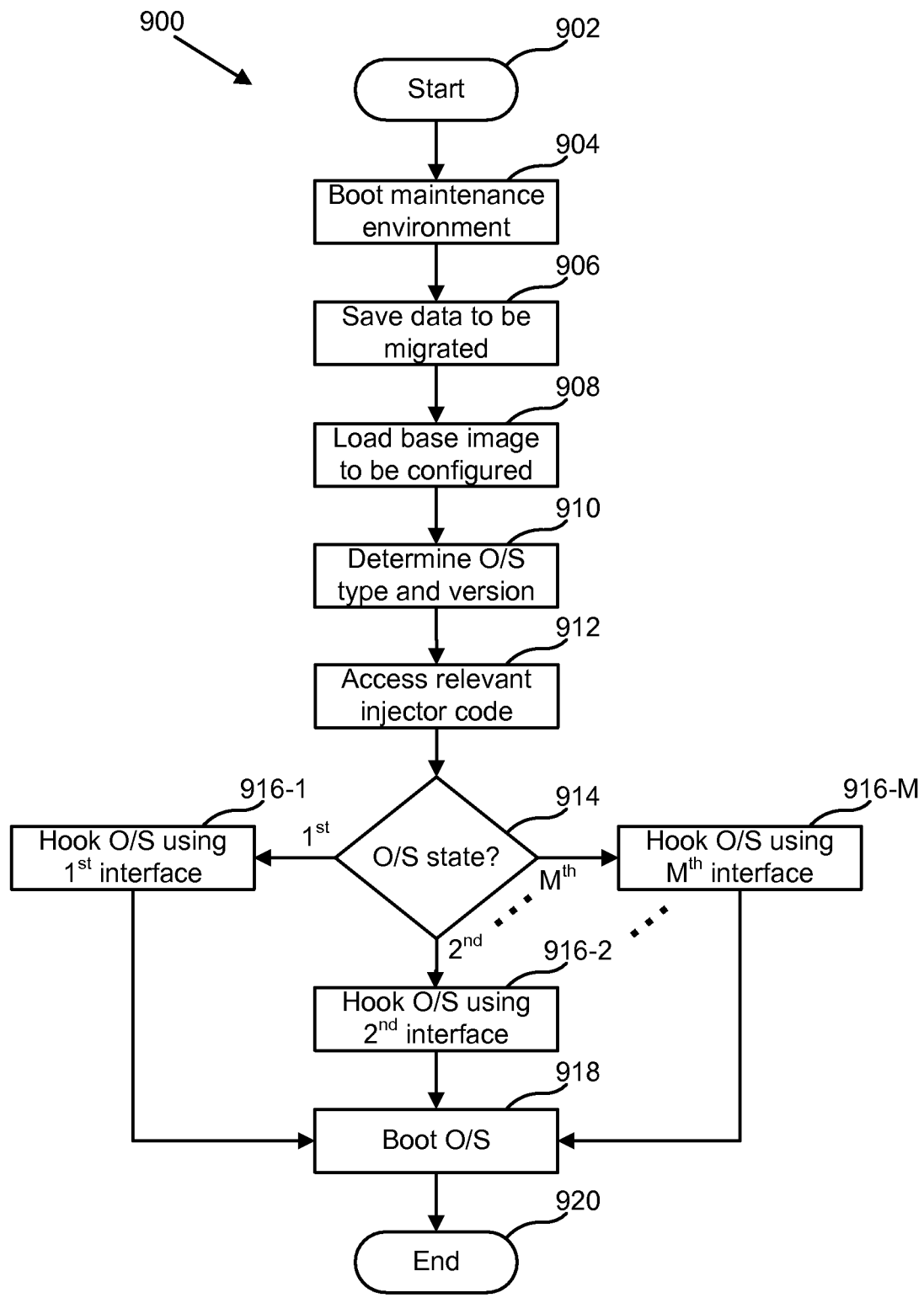
FIG. 9 is a schematic flow chart diagram illustrating one embodiment of a method for hooking an operating system to invoke injection of the integrated package in accordance with the present invention.

FIG. 9 is a schematic flow chart diagram illustrating one embodiment of a method for hooking an operating system 204 to invoke injection of the integrated package 402 in accordance with the present invention.

The term "hooking" is used in this context to mean the prior specification of program code to be automatically invoked at one or more defined interface points within the booting and execution of the operating system 204. For example, here is a list of available interface points that can be used to automatically run programs for the Windows operating system:

---

1) RunServiceOnce subkey: designed to start service programs before user logs on and before other registry subkeys start.
   a) HKEY_LOCAL_MACHINE\Software\Microsoft\Windows\CurrentVersion\RunServicesOnce
   b) HKEY_CURRENT_USER\Software\Microsoft\Windows\CurrentVersion\RunServicesOnce
2) RunServices subkey: loads immediately after RunServicesOnce and before user logon.
   a) HKEY_LOCAL_MACHINE\Software\Microsoft\Windows\CurrentVersion\RunServices
   b) HKEY_CURRENT_USER\Software\Microsoft\Windows\CurrentVersion\RunServices
3) Run subkey: The Run subkey in HKLM runs immediately before the Run subkey in HKCU.
   a) HKEY_LOCAL_MACHINE\Software\Microsoft\Windows\CurrentVersion\Run
   b) HKEY_CURRENT_USER\Software\Microsoft\Windows\CurrentVersion\Run
4) RunOnce subkey: primarily used by Setup programs. The HKLM subkey version of RunOnce runs programs immediately after logon and before other registry Run entries. The HKCU subkey version of RunOnce runs programs after Run subkeys and after the Startup folder.
   a) HKEY_LOCAL_MACHINE\Software\Microsoft\Windows\CurrentVersion\RunOnce
   b) HKEY_CURRENT_USER\Software\Microsoft\Windows\CurrentVersion\RunOnce
5) RunOnceEx subkey (XP only):
   a) HKEY_LOCAL_MACHINE\Software\Microsoft\Windows\CurrentVersion\RunOnceEx
6) RunOnce\Setup subkey: specifies programs to run after the user logs on
7) Explorer\Run subkey:
   a) HKEY_LOCAL_MACHINE\Software\Microsoft\Windows\CurrentVersion\Policies\Explorer\Run
   b) HKEY_CURRENT_USER\Software\Microsoft\Windows\CurrentVersion\Policies\Explorer\Run
8) Userinit subkey: there is an entry for userinit.exe but subkey can accept multiple comma-separated values.
   a) HKEY_LOCAL_MACHINE\Software\Microsoft\Windows NT\CurrentVersion\Winlogon\Userinit
9) Load subkey:
   a) HKEY_CURRENT_USER\Software\Microsoft\Windows NT\CurrentVersion\Windows\load
10) All Users Startup folder: very common place to find autostart programs for whoever logs on
    a) Documents and Settings\All Users\Start Menu\Programs\Startup folder
11) Startup folder: the most common location for programs to automatically boot from
    a) Documents and Settings\user\Start Menu\Programs\Startup folder
    b) If migrated from NT, the path is Profiles\user\Start Menu\Programs\Startup
12) Create a Window's Service which is configured to autostart

---

The method 900 starts 902 and a maintenance environment 400 is booted 904. Any existing data to be migrated is saved 906 in conjunction with an SMA (system migration assistant) facility. A base image to be configured is loaded 908 and inspected to determine 910 the operating system 204 type and version, such as Windows XP or Vista. On the basis of that determination, the corresponding injector module 410 code is accessed 912. Based upon an operating system 204 setup state 914, the operating system is hooked 916 using the appropriate interface. For example, a first state may be the sysprepped setup state and a second state may be the non-sysprepped setup state, and the respective interfaces may comprise one or more of the registry keys and folders described above. In order for the method to proceed automatically, hooking may also require the enabling of autologon, including the blanking out of any legal banner and removal of any welcome screen that could halt autologon. Finally, having been thus hooked or prepared for the automatic invocation of the appropriate injector module 410, the operating system 204 is then booted 918 so as to set the injection process in motion and the method 900 ends 920.

Figure 10:
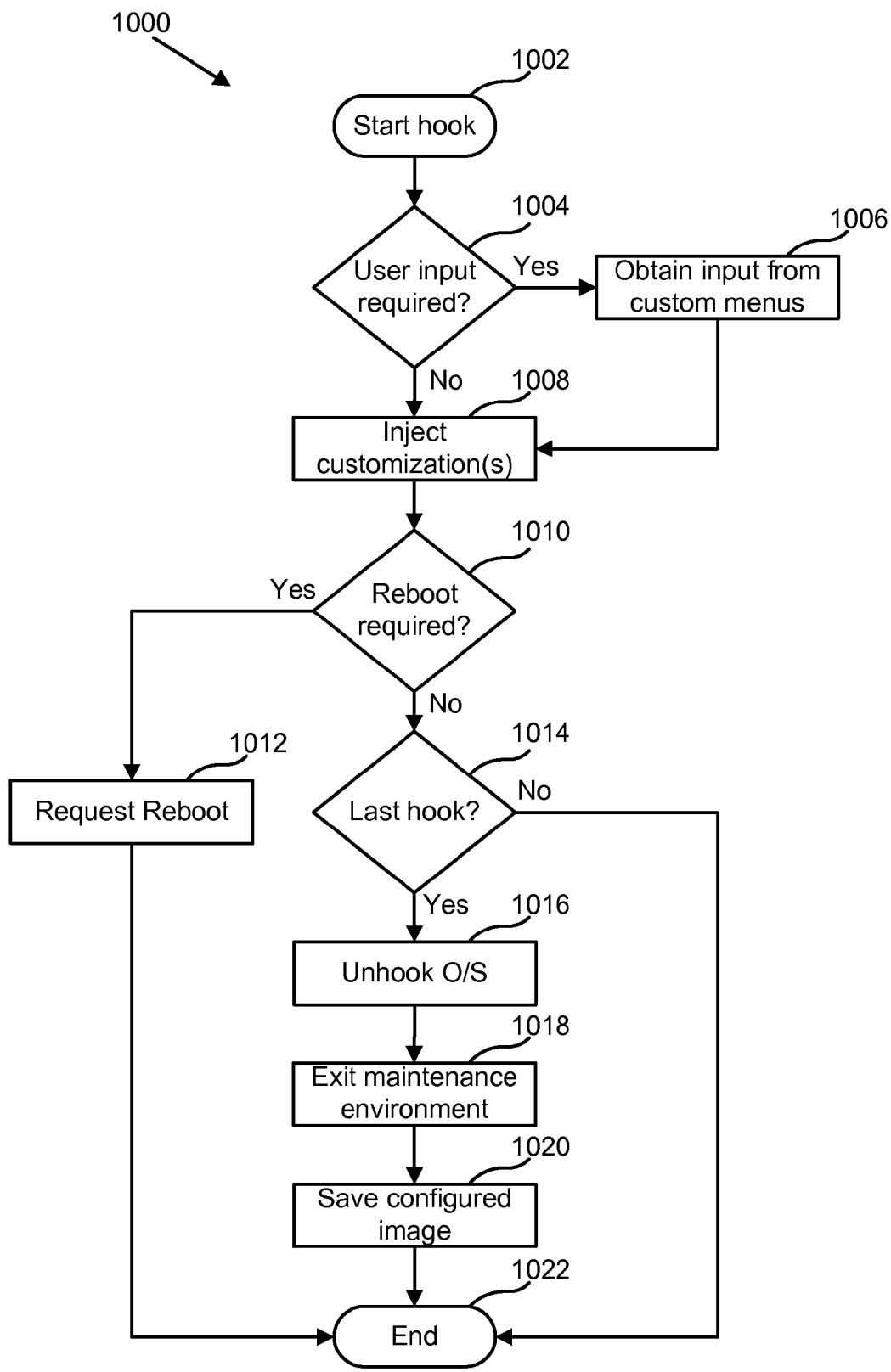
FIG. 10 is a schematic flow chart diagram illustrating one embodiment of a method for injecting the integrated package in response to a hook in the operating system in accordance with the present invention.

FIG. 10 is a schematic flow chart diagram illustrating one embodiment of a method for injecting the integrated package 402 in response to a hook in the operating system 204 in accordance with the present invention. Note that there may be more than one interface point that has been hooked within the operating system 204, each of which would thus invoke a separate instance of the method 1000. The method 100 starts 1002 and if user input is required 1004 then it is obtained 1006 via the custom menus 412. Any customization(s) related to the current instance may then be injected 1008, which may include the restoration of any saved user data under the SMA facility. If a reboot is required 1010, meaning that it is necessary in order to make the injected customization(s) fully effective, or that this instance must be re-invoked in order to continue the injection process after certain other prerequisite actions have been taken, then a reboot is requested 1012 and the current instance of the method 1000 ends 1022, to be started 1002 again later as a result of the requested reboot. If a reboot is not required 1010 and the current instance is not the last 1014, then the current instance of the method 1000 ends 1022. If the current instance is the last 1014, then the operating system 204 is unhooked 1016, including autologon disablement. The maintenance environment 400 is exited 1018, and the newly configured image containing the injected customization(s) is saved 1020, using for example a tool such as Ghost, PowerQuest, or ImageX, and the method 1000 ends 1022.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
  a single integrated package of computer disk image customizations, the package being deployed across a distributed storage system in at least three increasingly localized levels, respective localized levels corresponding to a geographic region,
    wherein instances of the package at respective localized levels comprise customizations from a foregoing level and further customizations based on the localized level, wherein the customizations include access to protected resources for a geographic region associated with the localized level;

a builder module configured to capture foregoing customizations applied to a foregoing disk image and incorporate the further customizations into an instance of the integrated package, the builder module further configured to generate one or more custom menus for obtaining additional customization information, wherein the number and content of the one or more custom menus generated are based on the localized level corresponding to a geographic region; and an injector module configured to programmatically apply the customizations from the integrated package to a target disk image, wherein the builder module and the injector module comprise one or more of logic hardware and executable code, storing the executable code on one or more non-transitory computer-readable media.

2. The apparatus of claim 1, wherein the additional customization information includes information which was not among the customizations applied to the base disk image and wherein at least a part of the customization information is inferred from a user characteristic obtained via the custom menus.

3. The apparatus of claim 1, wherein the integrated package is independent of a differing characteristic between the base disk image and the target disk image.

4. The apparatus of claim 3, wherein the differing characteristic is operating system type.

5. The apparatus of claim 3, wherein the differing characteristic is operating system version.

6. The apparatus of claim 3, wherein the differing characteristic is operating system state.

7. The apparatus of claim 6, wherein the operating system state is whether system preparation has been performed.

8. The apparatus of claim 1, wherein the integrated package contains customizations selected from the set consisting of domain, container, geographical location, network profile, wireless settings, email, data migration, application installation, and custom menus.

9. A system comprising:

a distributed storage system, the storage system comprising at least three hierarchal localized levels;

an integrated package of computer disk image customizations, the package being deployed across the distributed storage system in increasingly localized levels, respective localized levels corresponding to a geographic region, wherein instances of the package at respective localized levels comprise customizations from a foregoing level and further customizations based on the localized level, wherein the customizations include access to protected resources for a geographic region associated with the localized level;

a builder module configured to capture foregoing customizations applied to a base disk image and incorporate the further customizations into an instance of the integrated package;

one or more custom menus generated by the builder module to obtain customization information which was not among the customizations applied to the base disk image, wherein the number and content of the one or more custom menus generated are based on the localized level corresponding to a geographic region; and an injector module configured to programmatically apply the customizations from the integrated package and from the custom menus to a target disk image, independent of the base disk image, wherein the builder module and the injector module comprise one or more of logic hardware and executable code, storing the executable code on one or more non-transitory computer-readable media.

10. The system of claim 9, further comprising a maintenance environment running on the computer to host the builder module and the injector module.

11. The system of claim 10, wherein the maintenance environment is at least partially firmware-based.

12. The system of claim 10, wherein the maintenance environment is at least partially operating-system-based.

13. The system of claim 9, wherein the storage system is distributed across an organization.

14. The system of claim 13, wherein the storage system stores multiple instances of the integrated package having varying degrees of customization.

15. A computer program product comprising a non-transitory computer readable medium having computer usable program code executable to perform operations for customizing a disk image, the operations of the computer program product comprising:

building an integrated package of computer disk image customizations, the package being deployed across the distributed storage system in at least three increasingly localized levels, respective localized levels corresponding to a geographic region, wherein instances of the package at respective localized levels comprise customizations from a foregoing level and further customizations based on the localized level, the customizations including access to protected resources for a geographic region associated with the localized level, with the customizations that are specific to the localized level being added to a further customized instance of the integrated package and stored in a repository at that localized level on one or more non-transitory computer-readable media, by capturing customizations applied to a base disk image and incorporating the customizations into the further customized instances of the integrated package;

generating one or more custom menus to obtain customization information which was not among the customizations applied to the base disk image, wherein the number and content of the one or more custom menus generated are based on the localized level corresponding to a geographic region; and injecting the integrated package by programmatically applying the customizations from the integrated package and from the custom menus to a target disk image, independent of the base disk image.

16. The computer program product of claim 13, wherein the computer usable program code is executable in a maintenance environment.

17. The computer program product of claim 16, wherein the maintenance environment is at least partially firmware-based.

18. The computer program product of claim 16, wherein the maintenance environment is at least partially operating-system-based.

19. A machine-implemented method for customizing a computer disk image, the method comprising the steps of:
loading a base disk image;
applying computer disk image customizations;
capturing the customizations;
providing an integrated package of computer disk image customizations, the package being deployed across a distributed storage system in at least three increasingly localized levels, the increasingly localized levels corresponding to more precise geographic regions,
  wherein instances of the package at respective localized levels includes customizations from a foregoing level and further customizations based on the localized level with the customizations that are specific to the localized level being added to a further customized instance of the integrated package and stored in a repository at that localized level on one or more non-transitory computer-readable media,
  wherein the customizations include access to protected resources for a geographic region associated with the localized level;
incorporating the foregoing customizations and the further customizations into the further customized instances of the single integrated package;
generating one or more custom menus to obtain customization information which was not among the customizations applied to the base disk image,
  wherein the number and content of the one or more custom menus generated are based on the localized level corresponding to a geographic region;
loading a target disk image, independent of the base disk image;
injecting the integrated package by programmatically applying the customizations from the integrated package to the target disk image to yield a customized target disk image; and
saving the customized target disk image.

20. The method of claim 19, further comprising a step of generating one or more custom menus to obtain customization information which was not among the customizations applied to the base disk image.

21. The method of claim 19, wherein the step of injecting comprises hooking an operating system loaded from the target disk image to automatically invoke one or more programs to apply the customizations while the operating system is booting.

22. The method of claim 21, wherein hooking further comprises enabling autologon so as to not halt the operating system from booting unattended.

23. The method of claim 19, further comprising a step of saving data from a computer, as specified by data migration information in the integrated package, and the step of injecting further comprising restoring the data to the computer.

24. The method of claim 19, further comprising a step of loading the customized target disk image onto one or more computers, thereby cloning the computers.

* * * * *